(12) United States Patent
Huang et al.

(10) Patent No.: US 11,726,337 B1
(45) Date of Patent: Aug. 15, 2023

(54) SYSTEMS WITH ADJUSTABLE CUSHIONS

(71) Applicant: Apple Inc., Cupertino, CA (US)

(72) Inventors: XiaoYi Huang, Union City, CA (US); Anuranjini Pragada, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/372,202

(22) Filed: Jul. 9, 2021

Related U.S. Application Data

(60) Provisional application No. 63/070,774, filed on Aug. 26, 2020.

(51) Int. Cl.
*G02B 27/01* (2006.01)

(52) U.S. Cl.
CPC ..... *G02B 27/0176* (2013.01); *G02B 27/0149* (2013.01); *G02B 2027/0152* (2013.01); *G02B 2027/0154* (2013.01)

(58) Field of Classification Search
CPC .............. G02B 27/0149; G02B 27/017; G02B 27/0176; G02B 2027/0152; G02B 2027/0154
See application file for complete search history.

(56) References Cited

U.S. PATENT DOCUMENTS

| | | | |
|---|---|---|---|
| 6,701,535 B2 | 3/2004 | Dobbie et al. | |
| 9,989,998 B1 | 6/2018 | Yee | |
| 10,281,982 B2 | 5/2019 | Keller et al. | |
| 10,591,737 B2 | 3/2020 | Yildiz et al. | |
| 10,905,186 B2 | 2/2021 | Chang et al. | |
| 2009/0158501 A1 | 6/2009 | Lowe et al. | |
| 2019/0072772 A1 | 3/2019 | Poore et al. | |
| 2019/0250651 A1* | 8/2019 | Liu | G02B 27/0176 |
| 2019/0324280 A1* | 10/2019 | Yildiz | G02B 27/0176 |
| 2020/0150597 A1 | 5/2020 | Aghara et al. | |
| 2020/0246693 A1* | 8/2020 | Connor | G06F 1/163 |
| 2021/0080996 A1 | 3/2021 | Hudman et al. | |

FOREIGN PATENT DOCUMENTS

WO WO-2014082023 A1 * 5/2014 ........... G02B 27/017

* cited by examiner

*Primary Examiner* — Alexander Eisen
*Assistant Examiner* — Cory A Almeida
(74) *Attorney, Agent, or Firm* — Treyz Law Group, P.C.; G. Victor Treyz; David K. Cole

(57) ABSTRACT

A head-mounted device may have a head-mounted housing. The head-mounted housing may have rear-facing displays that display images for a user. The images are viewable from eye boxes while the head-mounted device is being worn by the user. An electrically adjustable face cushion may be provided between the head-mounted housing and the user's face. The electrically adjustable face cushion may have adjustable elements such as adjustable inflation air bags. Airflow control systems formed from electrically adjustable airflow valves, check valves, and air pumps may be used in controlling inflation of the adjustable inflation air bags in responses to changes in operating mode of the head-mounted device and/or in response to sensor data or other input. The sensor data may include strain gauge measurements of facial pressure on the air bags.

20 Claims, 9 Drawing Sheets

US 11,726,337 B1

SYSTEMS WITH ADJUSTABLE CUSHIONS

This application claims the benefit of provisional patent application No. 63/070,774, filed Aug. 26, 2020, which is hereby incorporated by reference herein in its entirety.

FIELD

This relates generally to electronic devices, and, more particularly, to electronic devices such as head-mounted devices.

BACKGROUND

Electronic devices such as head-mounted devices may have displays for displaying images. The displays may be housed in a head-mounted support structure.

SUMMARY

An electronic device such as a head-mounted device may include displays for displaying visual content for a user. A head-mounted support structure may be used to support rear-facing displays. The rear-facing displays may display left and right images that are viewable through respective left and right lenses from rear eye boxes located at the rear of the head-mounted support structure.

The head-mounted device may display different types of content during different operating modes. For example, gaming content may be displayed on the left and right displays during operation in a gaming mode and movie content may be displayed on the displays during operation in a movie mode.

The head-mounted device may have an electrically adjustable face cushion. The face cushion may be attached to a rear-facing peripheral edge of the head-mounted support structure and may have a ring shape. The electrically adjustable face cushion may have adjustable elements such as adjustable inflation air bags. Airflow control systems formed from electrically adjustable airflow valves, check valves, and air pumps may be used in controlling inflation of the adjustable inflation air bags in responses to changes in the operating mode of the head-mounted device and/or in response to sensor data or other input. The sensor data may include strain gauge measurements of facial pressure on the air bags.

DETAILED DESCRIPTION

Head-mounted devices include head-mounted support structures that allow the devices to be worn on the heads of users. Displays may be used for presenting a user with visual content. To provide comfort for a user while wearing a head-mounted device, a head-mounted device may be provided with a face cushion. The face cushion may contain foam or other soft material that rests against the user's face while the head-mounted support structures are being worn. Adjustable devices such as adjustable air bags or other adjustable fluid-filled bladders may be incorporated into the face cushion. This allows the face cushion to be adjusted to accommodate the shapes of individual users as well as different usage scenarios.

Figure 1:
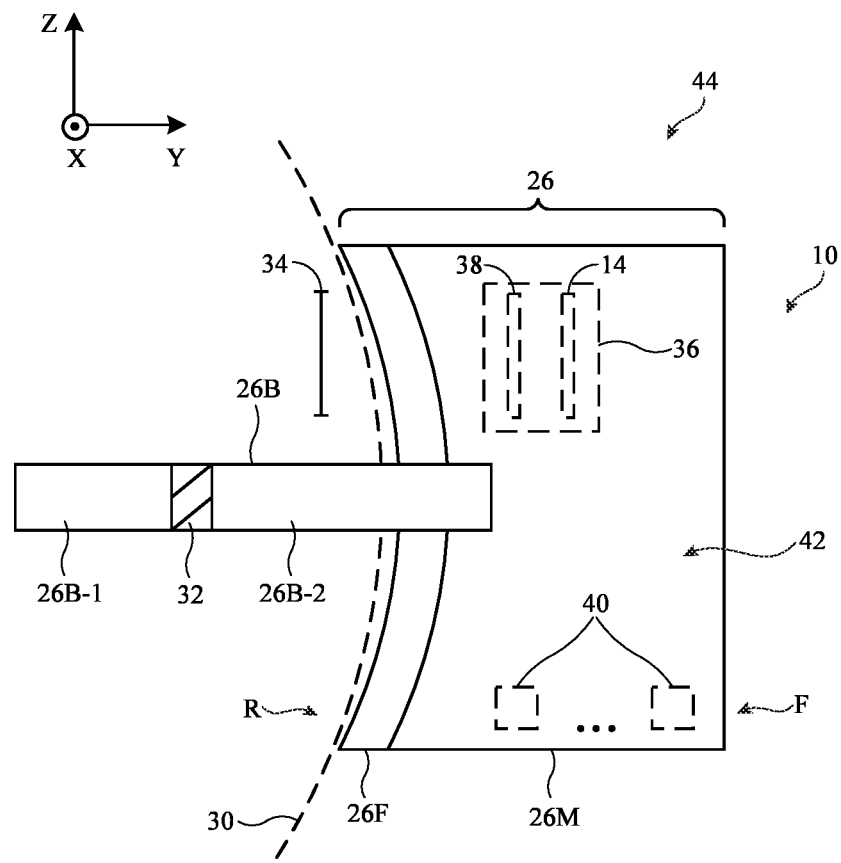
FIG. 1 is a side view of an illustrative electronic device such as a head-mounted display device in accordance with an embodiment.

FIG. 1 is a side view of an illustrative head-mounted electronic device. As shown in FIG. 1, head-mounted device 10 may include head-mounted support structure 26. Support structure 26 may have walls or other structures that separate an interior region of device 10 such as interior region 42 from an exterior region surrounding device 10 such as exterior region 44. Electrical components 40 (e.g., integrated circuits, sensors, control circuitry, input-output devices, etc.) may be mounted on printed circuits and/or other structures within device 10 (e.g., in interior region 42). To present a user with images for viewing from eye boxes such as eye box 34, device 10 may include displays such as display 14 and lenses such as lens 38. These components may be mounted in optical modules such as optical module 36 (e.g., a lens barrel) to form respective left and right optical systems. There may be, for example, a left display for presenting an image through a left lens to a user's left eye in a left eye box and a right display for presenting an image to a user's right eye in a right eye box. The user's eyes are located in eye boxes 34 when structure 26 rests against the outer surface (face surface 30) of the user's face.

Support structure 26 may include a main housing support structure such as portion 26M and an electrically adjustable face cushion such as face cushion 26F that can be adjusted based on control signals from control circuitry in device 10. Main housing portion 26M may form front side F of device 10. Adjustable face cushion 26F may be mounted on an opposing rear side R of support structure 26. If desired, support structure 26 may include optional head straps such as strap 26B and/or other head-mounted support structures. In the example of FIG. 1, strap 26B has rear portion 26B-1 and front portion 26B-2. Rear portion 26B-1 is coupled to front portion 26B-2 by optional adjustable actuator 32 (e.g., an electromagnetic actuator or other suitable actuator). Actuator 32 may be electrically controlled to adjust the tightness of band 26B (e.g., by moving portions 26B-1 and 26B-2 together or apart) and may therefore sometimes be referred to as a headband adjustment actuator or global tightness actuator.

Electrically adjustable face cushion 26F may have one or more adjustable elements for adjusting the fit of cushion 26F and thereby adjusting the fit of head-mounted support structure 26 on the face of the user. In an illustrative configuration, which is described herein as an example, adjustable face cushion 26F has an array of adjustable inflation air bags (e.g., air bags with an adjustable volume and/or pressure) that extend within cushion 26F in a ring around the perimeter of the rear of head-mounted support structure 26 (e.g., on a rear edge of structure 26 facing the user's face surface 30). The air bags may be globally and/or individually controlled to customize the fit of device 10.

Figure 2:
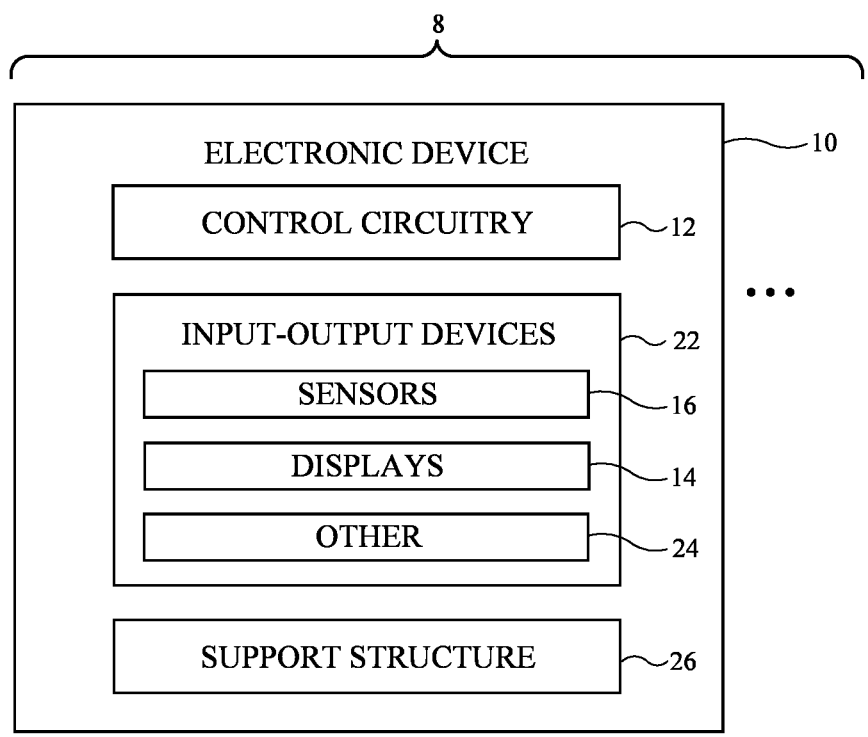
FIG. 2 is schematic diagram of an illustrative system with an electronic device in accordance with an embodiment.

A schematic diagram of an illustrative system that may include a head-mounted device with an adjustable face cushion is shown in FIG. 2. As shown in FIG. 2, system 8 may have one or more electronic devices 10. Devices 10 may include a head-mounted device (e.g., device 10 of FIG. 1), accessories such as headphones, associated computing equipment (e.g., a cellular telephone, tablet computer, laptop computer, desktop computer, and/or remote computing equipment that supplies content to a head-mounted device), and/or other devices that communicate with the head-mounted device.

Each electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network transceiver circuitry (e.g., WiFi® circuitry), millimeter wave transceiver circuitry, and/or other wireless communications circuitry.

During operation, the communications circuitry of the devices in system 8 (e.g., the communications circuitry of control circuitry 12 of device 10) may be used to support communication between the electronic devices. For example, one electronic device may transmit video data, audio data, and/or other data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 2, input-output devices 22 may include one or more displays such as displays 14. In some configurations, device 10 includes left and right display devices. Device 10 may, for example, include left and right components such as left and right scanning mirror display devices or other image projectors, liquid-crystal-on-silicon display devices, digital mirror devices, or other reflective display devices, left and right display panels based on light-emitting diode pixel arrays (e.g., organic light-emitting display panels or display devices based on pixel arrays formed from crystalline semiconductor light-emitting diode dies), liquid crystal display panels, and/or or other left and right display devices that provide images to left and right eye boxes for viewing by the user's left and right eyes, respectively.

During operation, displays 14 may be used to display visual content for a user of device 10. The content that is presented on displays 14 may include virtual objects and other content that is provided to displays 14 by control circuitry 12. This virtual content may sometimes be referred to as computer-generated content. Computer-generated content may be displayed in the absence of real-world content or may be combined with real-world content. In some configurations, a real-world image may be captured by a camera (e.g., a forward-facing camera, sometimes referred to as a front-facing camera) so that computer-generated content may be electronically overlaid on portions of the real-world image (e.g., when device 10 is a pair of virtual reality goggles).

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, capacitive proximity sensors, light-based (optical) proximity sensors, other proximity sensors, force sensors (e.g., strain gauges, capacitive force sensors, resistive force sensors, etc.), sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, circuits for receiving wireless power, circuits for transmitting power wirelessly to other devices, batteries and other energy storage devices (e.g., capacitors), joysticks, buttons, and/or other components.

Electronic device 10 may have head-mounted support structures such as head-mounted support structure 26 (e.g., head-mounted housing structures such as housing walls, straps, etc.). The head-mounted support structure may be configured to be worn on a head of a user (e.g., against the user's face covering the user's eyes) during operation of device 10 and may support displays 14, sensors 16, other components 24, other input-output devices 22, and control circuitry 12 (see, e.g., components 40 and optical module 36 of FIG. 1).

Figure 3:
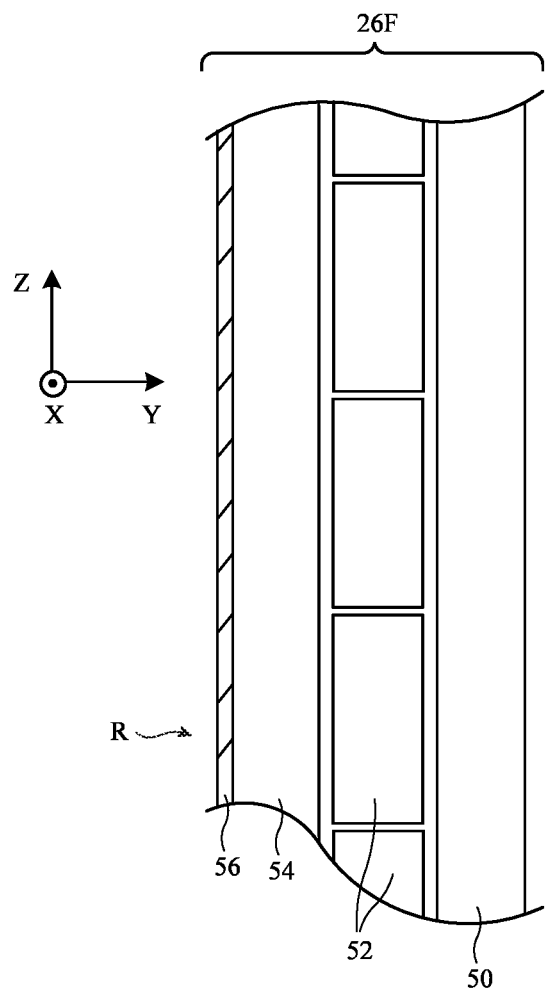
FIG. 3 is a cross-sectional side view of a portion of an illustrative electronic device with an electrically adjustable face cushion in accordance with an embodiment.

FIG. 3 is a cross-sectional side view of an illustrative adjustable face cushion for device 10. As shown in FIG. 3, adjustable face cushion 26F may include multiple layers. Layers such as layer 50 may include one or more printed circuits (e.g., a flexible printed circuit formed from a layer of polyimide or a sheet of other flexible polymer material and/or rigid printed circuit boards formed from fiberglass-filled epoxy or other rigid printed circuit board material). Sensors 16 (e.g., force sensors such as strain gauges) may be mounted on the printed circuit (e.g., to detect pressure in the +Y direction as the user's face presses outwardly on rear face R of device 10). Adjustable face cushion 26F may also include a layer of inflatable air bags 52. Air bags 52 may be inflated and deflated under control of control circuitry 12 (FIG. 2) to help adjust the shape of cushion 26F.

The inner (rear-facing) surface of cushion 26F may be covered with a cover layer such as layer 56. Layer 56 may be formed from polymer, fabric, cotton or other natural materials, and/or other layer(s) of material (e.g., a layer with an attractive appearance that is durable and comfortable when worn against the user's face). One or more optional soft layers such as foam layer 54 may be interposed between cover layer 56 and the other structures of cushion 26F. Layer 54 may be formed from closed cell and/or open cell soft foam material that enhances comfort as cushion 26F is worn against a user's face.

Figure 4:
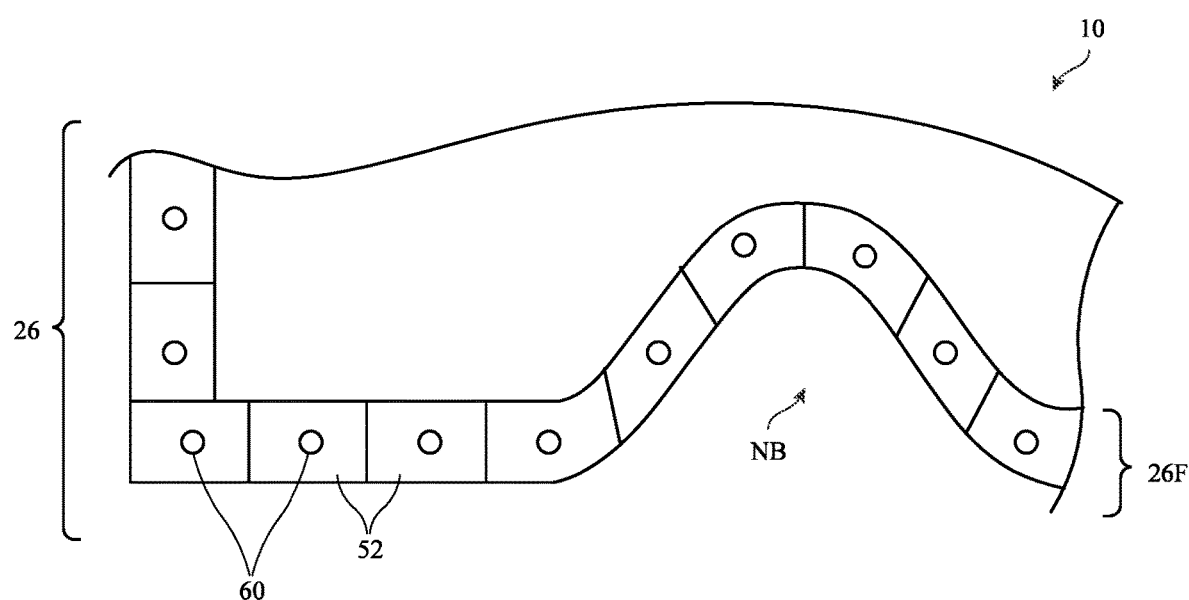
FIG. 4 is a rear view of a portion of an illustrative electronic device with a ring-shaped electrically adjustable face cushion in accordance with an embodiment.

As shown in the rear view of device 10 of FIG. 4, adjustable face cushion 26F and the layers of FIG. 3 that form cushion 26F may have ring shapes that extend around the peripheral edge of rear side R of head-mounted support structure 26 (e.g., a ring shape configured to conform to the shape of the user's face that extends around the perimeter of device 10). Portion NB of cushion 26F may be configured to fit over the bridge of the user's nose as device 10 is worn against the user's face. Air bags 52 may extend in a ring of one or more rows around the perimeter of device 10 (e.g., along the outer edge of the rear of device 10). In the example of FIG. 4, there is a single row of air bags 52 that runs along the device perimeter. Each air bag 52 may have an associated airflow control system 60 for controlling airflow for that air bag 52. Using airflow control systems 60, control circuitry 12 can adjust inflation of each air bag 52. Airflow control systems 60 may include air handling components such as airflow valves (e.g., check valves, electrically controlled valves, etc.) and air pumps (e.g., piezoelectric air pumps). When it is desired to increase the pressure in a given air bag 52 and thereby expand its size (e.g., in rearward direction −Y), the airflow control system for the given air bag may inflate that air bag. When it is desired to decrease the pressure in a given air bag, the airflow control system for that bag may allow air to escape from the bag (e.g., to deflate one or more bags to relieve excess pressure on the user's face at particular locations along the perimeter of rear face R of device 10).

Figure 5:
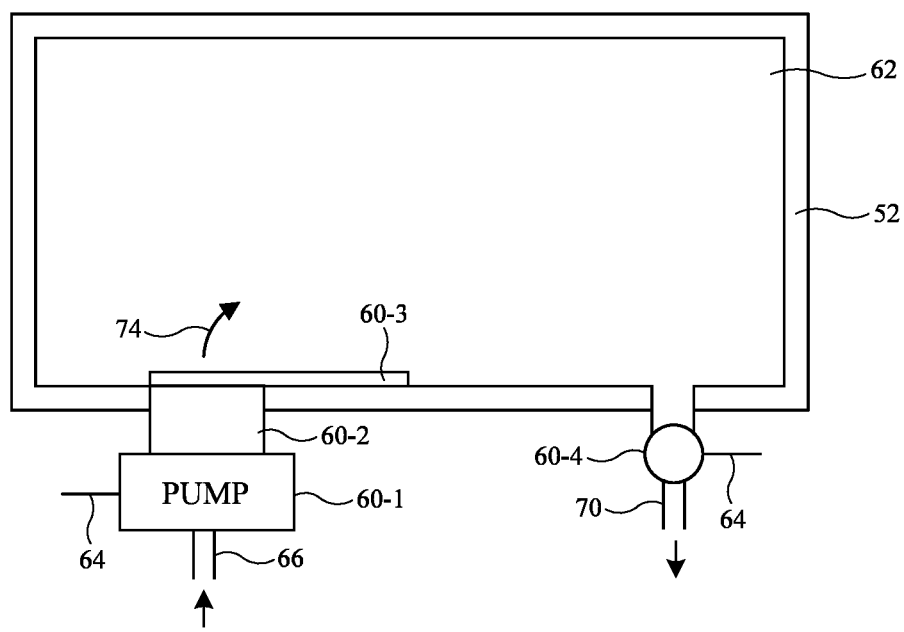
FIGS. 5 and 6 are cross-sectional side views of illustrative inflatable air bags and airflow control systems in accordance with an embodiment.

An illustrative air bag arrangement is shown in FIG. 5. In the example of FIG. 5, airflow control system 60 includes pump 60-1, chamber 60-2, air intake check valve 60-3, and electrically controlled air exit valve 60-4. Pump 60-1 may be a piezoelectric pump with a diaphragm that is moved by a piezoelectric actuator or may be an electromagnetic pump or other pump. Control circuitry 12 may control the operation of pump 60-1 and electrically controlled valve 60-4 using control signals applied to control inputs 64.

Air bag 52 may have an interior region 62 that is filled with air. When it is desired to increase the amount of air in interior region 62 and thereby further inflate air bag 52, pump 60-1 may be directed by control circuitry 12 to pump air from air inlet 66 to chamber 60-2. As the pressure in chamber 60-2 rises, check valve 60-3 will be forced open in direction 74, thereby introducing air into interior 62 from chamber 60-2 through an airflow opening in air bag 52 that is aligned with check valve 60-3. Following inflation, check valve 60-3 prevents reverse airflow through air inlet 66. Valve 60-4 is closed during inflation. When it is desired to decrease the amount of air in interior region 62, valve 60-4 may be opened by control circuitry 12 to release air through an opening in air bag 52 that is aligned with valve 60-4 and through air outlet 70.

Figure 6:
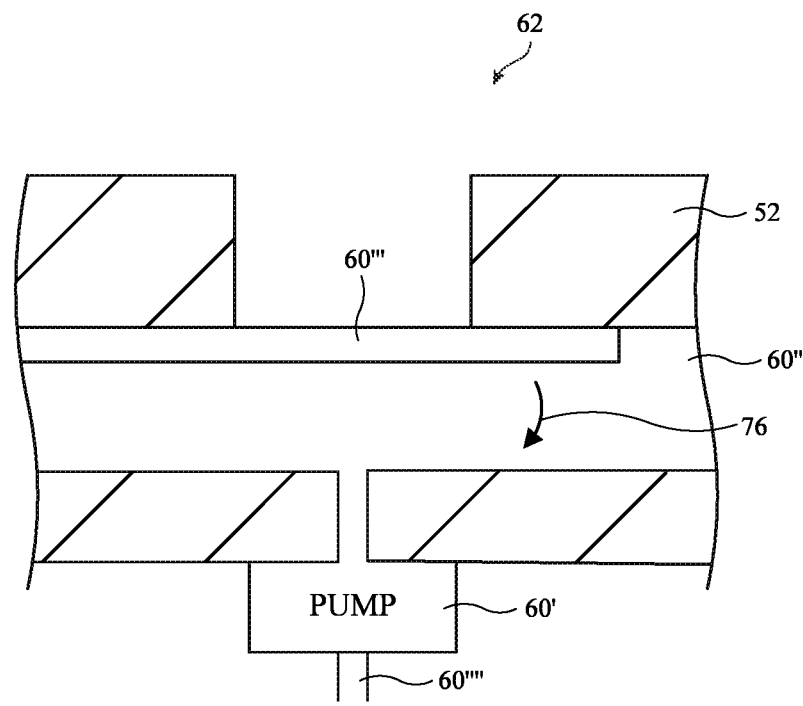

In general, each airflow control system may have one or more airflow control components such as inlet and/or outlet valves, pumps, etc. In the illustrative configuration for airflow control system 60 that is shown in FIG. 6, pump 60' is used to control air pressure in air chamber 60" (e.g., by pumping air into chamber 60" through air passageway 60""). When the air pressure in air chamber 60" is greater than the pressure in interior region 62, exit check valve 60''' will be held closed, thereby preventing air from interior region 62 from escaping. When it is desired to release air from interior region 62, a pump, electrically controlled valve, and/or other airflow component associated with airflow control system 60 can relieve the air pressure in chamber 60". This allows check valve 60''' to open in direction 76 and allows air to exit interior region 62 through pump and passageway 60"".

Figure 7:
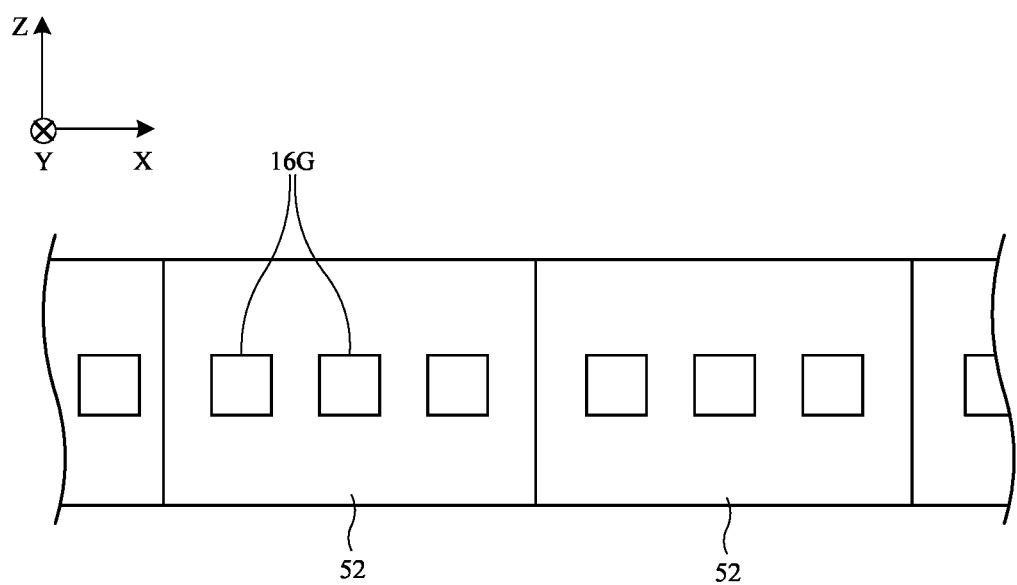
FIG. 7 is a top view of an illustrative portion of a face cushion with air bags overlapping strain gauges in accordance with an embodiment.

Sensors 16 may include strain gauge sensors or other sensors (e.g., other force/pressure sensors) for sensing the amount of force presented by cushion 26F against the face of the user at various locations (e.g., the amount of facial pressure exerted by the user's face on various parts of cushion 26F). FIG. 7 is a rear view of a portion of cushion 26F showing how air bags 52 may have associated strain gauge sensors 16G. There may one or more air bags 52 associated with each sensor 16G or there may be one or more (e.g., three) sensors 16G associated with each air bag 52 as shown in FIG. 7. Control circuitry 12 can monitor the output of strain gauge sensors 16G in real time and can adjust the inflation of air bags 52 accordingly. If, for example, sensors 16G detect that a particular location along cushion 26F is associated with a high amount of strain gauge sensor output (e.g., measured facial pressure from cushion 26F on the adjacent portion of the user's face that exceeds a desired threshold amount), control circuitry 12 can use one or more airflow control systems 60 at or near the location of that elevated amount of pressure to deflate one or more corresponding air bags 62. This selective air bag deflation may help relieve localized pressure on the user's face that might otherwise be uncomfortable for the user.

Figure 8:
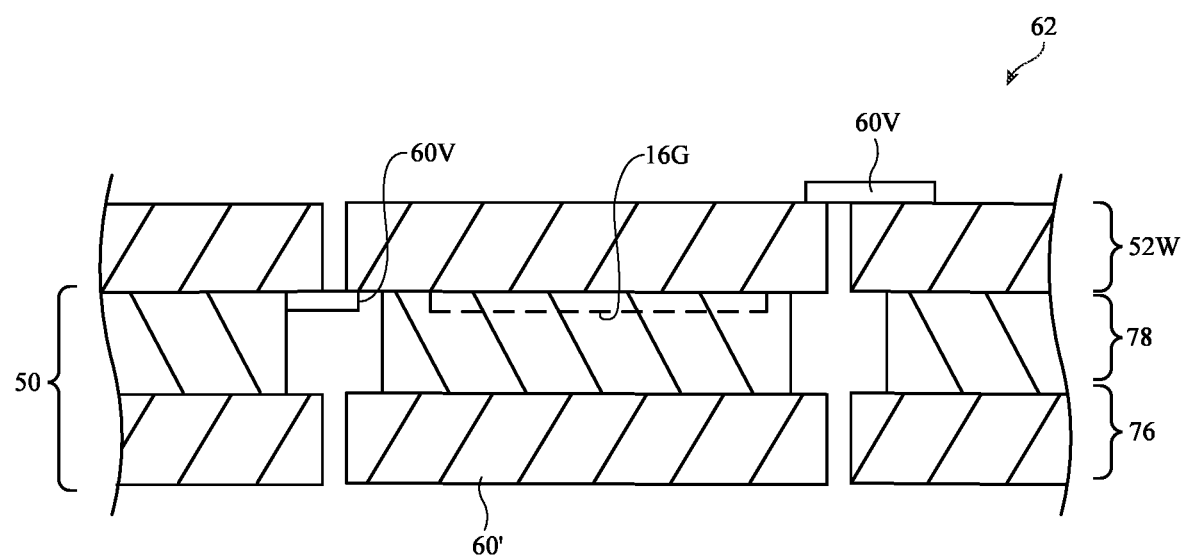
FIG. 8 is a cross-sectional side view of a portion of an adjustable face cushion having a ring of strain gauge sensors on a printed circuit interposed between a ring of air bags and a ring of airflow control systems in accordance with an embodiment.

FIG. 8 is a cross-sectional side view of a portion of an adjustable face cushion. As shown in FIG. 8, sensor layer 78 may be interposed between air bag wall 52W of air bag 52 and airflow system layer 76. Air bag wall 52W may be formed from a layer of polymer (e.g., a polymer such as silicone or other elastomeric material, other polymer, etc.). Airflow system layer 76 may include structures for forming airflow systems 60 (e.g., layer 76 may include piezoelectric pump components such as piezoelectric actuators, pump diaphragms, pump valves, may include check valves, may include internal air chambers, may include electrically controlled valves, and/or other airflow control system components). Sensor layer 78 may include a substrate such as a printed circuit substrate (e.g. a flexible printed circuit substrate or rigid printed circuit substrate). Metal traces on the substrate may be used in forming signal interconnect lines and strain gauge sensors 16G. Aligned openings may pass through layers 76 and 78 and through the layer of polymer or other material forming air bag wall 52W to form airflow ports (e.g., air inlets and/or air outlets). The adjustable face cushion may have one or more check valves 60V for controlling airflow through airflow inlets and outlets.

Using an electrically adjustable face cushion with adjustable inflation air bags, control circuitry 12 can adjust device 10 so that device 10 fits satisfactorily on the head of the user. Some activities may require a snugger fit than others. For example, gaming activities may benefit from a snug fit of device 10 (to prevent slippage) whereas movie viewing activities may benefit from a looser fit of device 10 (to enhance comfort when slippage is less of a concern). If desired, control circuitry 12 can control airflow systems to inflate and/or deflate air bags 52 based on the current operating mode of device 10. If, as an example, device 10 is being operated in a gaming mode where video game content (gaming content) is being displayed for the user, control circuitry 12 may inflate air bags 52 and may optionally tighten strap 26B using actuator 32 (FIG. 1) to tighten the fit of device 10 on the user's head. A user may also manually supply user input to input-output devices 22. This user input may include, for example, commands that direct circuitry 12 to use airflow control systems 60 and/or actuator 32 to tighten and/or loosen device 10. Adjustments based on user input, strain gauge measurements from strain gauges 16G and/or other sensor measurements may be made globally (e.g., to globally tighten and/or loosen device 10) and/or may be made locally (e.g., to inflate air bags 52 along one part of cushion 26F while deflating or not adjusting other air bags 52.

Each user's face potentially has a different shape (e.g., a different curvature, different facial features, etc.). If desired, a three-dimensional camera may be used to capture a three-dimensional image of the user's face. This three-dimensional image may then be used by control circuitry 12 to determine how to adjust cushion 26H. If, for example, the user's face is narrow and has a highly-curved cross-sectional profile, the air bags 52 for cushion 26F may be inflated along the left and right sides of device 10 (e.g., to ensure a sufficiently tight fit along the left and right sides of the user's face). If, as another example, the user's face is wide and has a slightly-curved cross-sectional profile, the air bags 52 for cushion 26F may be deflated along the left and right sides of device 10 (e.g., to ensure that device 10 is not too tightly fitting at the edges of the user's face). Air bags 52 may be adjusted in this way to create a three-dimensional surface for cushion 26F on rear face R of device 10 that conforms to the corresponding measured three-dimensional shape of the adjacent cushion-shaped area on the user's face (e.g. the contours of cushion 26F may be adjusted to accommodate the measured contours of face surface 30 that are captured by capturing a three-dimensional face scan of the user's face with a three-dimensional image sensor in device 10 or other device in system 8). In general, any of these types of adjustments (adjustments based on user input, adjustments based on strain gauge measurements of cushion pressure at various different locations along cushion 26H, adjustments based on the current operating mode of device 10, and/or other adjustments) may be made by device 10 to help ensure that device 10 can be satisfactorily worn and used by the user.

Figure 9:
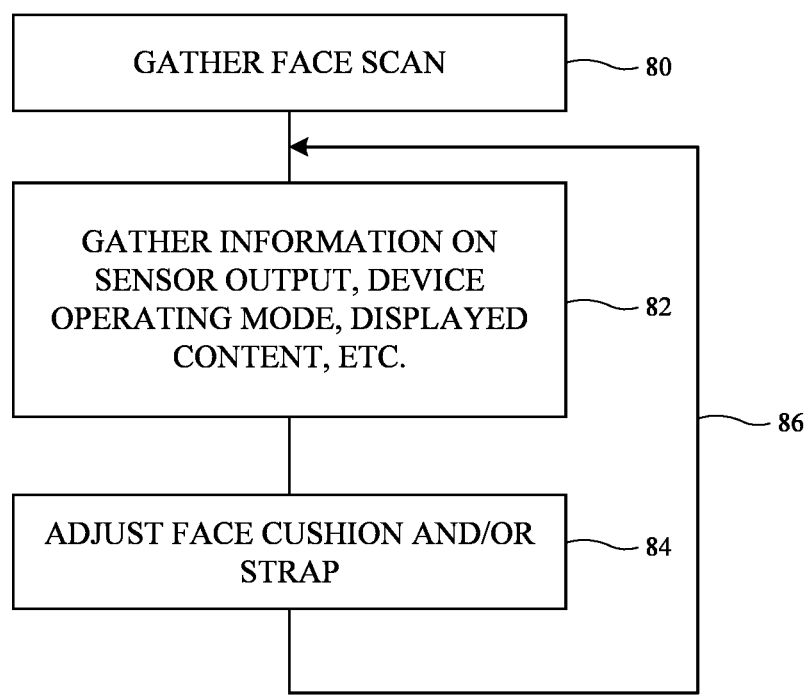
FIG. 9 is a flow chart of illustrative operations involved in using a head-mounted device with an adjustable face cushion in accordance with an embodiment.

FIG. 9 is a flow chart of illustrative operations involved in using a head-mounted device with an adjustable face cushion such as electronic device 10 of FIG. 1.

During the operations of block 80, device 10 may gather information on the user of device 10. For example, a three-dimensional image sensor, camera, and/or other sensor 16 in device 10 may be used to measure the user's face. A structured light sensor or other three-dimensional sensor on device 10 may, as an example, capture a three-dimensional image of the user's face (e.g., a three-dimensional facial scan). To capture the image, the user may remove device 10 from the user's head and may point the three-dimensional image sensor (three-dimensional camera) at the user's face. To help ensure that the three-dimensional image sensor is able to capture an accurate three-dimensional image, the three-dimensional image sensor may capture images from different perspectives in front of the user's face (e.g., as the user moves device 10 back and forth in the front of the user's face). The three-dimensional shape (three-dimensional image) of the user's face may be saved in device 10 for subsequent use in adjusting (e.g., pre-adjusting) cushion 26F.

After gathering information on facial shape (e.g., facial feature size, shape, and location, head shape, etc.), control circuitry 12 can optionally cushion 26F to match (at least in a preliminary fashion) the shape of the user's face. The user may then place device 10 on the user's face and may begin to use device 10 (e.g., to the user may view images on displays 14). During the operations of block 82, as device 10 is being used by a user while being worn on the user's face, strain gauges 16G and/or other input-output devices 22 may gather information on the operation of device 10 (e.g., information on the amount of force at each strain gauge 16G, information on the current operating mode of device 10 including information on the type of content being displayed by displays 14, information on the current time, information on the user's activity level such as movement measurements from a movement sensor such as an inertial measurement unit, accelerometer, gyroscope, etc.).

Due to the pre-adjustment of cushion 26F based on the shape of the user's face following the gathered facial scan of block 80, the user will experience an improved fit of device 10 on the user's face during the operations of block 82 and sensors such as strain gauges 16G are able to accurately measure local pressure points and other areas of cushion 26F that may affect the fit of device 10. During the operations of block 84, face cushion 26F may be adjusted based on the information gathered during the operations of blocks 80 and 82. For example, in addition to the preliminary adjustments based on the user's facial scan, subsequent fine adjustments based on strain gauge feedback and/or other real-time sensor measurements may be made. Cushion 26F may also be adjusted based on user input, and/or based on additional information (e.g., current operating mode, etc.). If desired, cushion 26F may be tightened if the user is operating in a mode that typically benefits from a tighter fit (e.g., a gaming mode) and/or if a motion sensor in device 10 detects more than a threshold amount of movement (indicating that the user is actively moving about while wearing device 10). In response to detecting that the user is operating in a mode that typically benefits from a looser fit (e.g., a moving viewing mode) and/or if the motion sensor detects that the user is lying down or is otherwise at rest (e.g., when detected accelerometer output or other motion sensor output is below a predetermined threshold amount, cushion 26F may be loosened. In response to detecting user input directing device 10 to loosen or tighten some or all of cushion 26F, the air bags in cushion 26F may be selectively deflated or inflated. Strain gauge measurements that identify localized pressure points can also cause device 10 to locally deflate corresponding air bags 52, whereas strain gauge measurements that identify locations where the fit of cushion 26F is loose can cause device 10 to inflate associated air bags 52 to compensate. In some configurations, device 10 may periodically tighten and loosen cushion 26F (e.g. to enhance comfort by periodically lowering facial pressure). Adjustments to cushion 26F can also be made depending on whether a user's detected orientation (e.g., from an accelerometer reading) is flat (e.g., lying down) so that cushion 26F should be pressured evenly or upright (e.g., sitting up) so that cushion 26F should be pressured more at the bottom edge than at the top edge to account for potentially uneven forces due to gravity. Other types of sensor readings (e.g., readings of environmental factors such as temperature, humidity, etc., readings of user state such as heart rate, perspiration level, other physiological attributes, etc.) may be used to determine whether adjustments should be made to enhance user comfort (e.g., to loosen cushion 26F during high heat and high humidity conditions, to loosen cushion 26F when high stress is detected, etc.). These adjustments and/or other adjustments may be made dynamically as the user is viewing content and otherwise interacting with device 10.

As indicated by line 86 of FIG. 9, the operations of blocks 82 and 84 may be performed continuously while the user is wearing device 10.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/ earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
a head-mounted support structure having a rear and an opposing front;
left and right lenses in the head-mounted support structure;
left and right rear-facing displays configured to provide respective left and right rear images at the rear viewable from left and right eye boxes through the left and right lenses;
an electrically adjustable face cushion on the rear; and
strain gauges mounted in the electrically adjustable face cushion that are configured to gather strain measurements associated with inward pressure at corresponding locations along the electrically adjustable face cushion.

2. The head-mounted device defined in claim 1, wherein the electrically adjustable face cushion comprises adjustable inflation air bags and airflow control systems configured to adjust inflation of the adjustable inflation air bags, wherein the airflow control systems are configured to adjust the inflation of the adjustable inflation air bags based on the gathered strain measurements.

3. The head-mounted device defined in claim 2 wherein the airflow control systems comprise valves.

4. The head-mounted device defined in claim 3 wherein the airflow control systems comprise air pumps.

5. The head-mounted device defined in claim 4 wherein the valves comprise check valves.

6. The head-mounted device defined in claim 5 wherein the valves comprise electrically adjustable valves.

7. The head-mounted device defined in claim 2 further comprising control circuitry configured to control the airflow control systems to adjust the inflation of the adjustable inflation air bags based on a three-dimensional face scan.

8. The head-mounted device defined in claim 2 further comprising control circuitry configured to:

control the airflow control systems to inflate the adjustable inflation air bags in response to operating in a gaming mode in which gaming content is displayed on the left and right rear-facing displays; and
control the airflow control systems to deflate the adjustable inflation air bags in response to operating in a movie mode in which movie content is displayed on the left and right rear-facing displays.

9. The head-mounted device defined in claim 2 further comprising:
a motion sensor configured to gather motion information on movement of the head-mounted support structure; and
control circuitry configured to control the airflow control systems based on the gathered motion information.

10. The head-mounted device defined in claim 9 wherein the control circuitry is configured to use the airflow control systems to inflate the adjustable inflation air bags in response to detecting more than a predetermined amount of motion with the motion sensor.

11. The head-mounted device defined in claim 1 wherein the electrically adjustable face cushion comprises:
a ring of adjustable air bags extending around a peripheral edge of the rear of the head-mounted support structure.

12. The head-mounted device defined in claim 11 wherein the electrically adjustable face cushion comprises a ring of airflow control systems extending along the ring of adjustable air bags to adjust inflation of the adjustable air bags.

13. The head-mounted device defined in claim 12 wherein the electrically adjustable face cushion comprises a printed circuit, and wherein the strain gauges are formed as a ring of strain gauges on the printed circuit that extends along the ring of adjustable air bags.

14. The head-mounted device defined in claim 13 wherein the printed circuit is between the ring of airflow control systems and the ring of adjustable air bags.

15. The head-mounted device defined in claim 14 wherein ring of airflow control systems comprises piezoelectric air pumps.

16. A head-mounted device configured to be worn on a face of a user, comprising:
left and right optical systems configured to display images viewable respectively from left and right eye boxes;
a head-mounted support structure that supports the left and right optical systems;
a ring-shaped electrically adjustable face cushion that extends around a peripheral edge of the head-mounted support structure facing the left and right eye boxes, wherein the ring-shaped electrically adjustable face cushion comprises a ring of adjustable inflation air bags;
airflow control systems coupled to the adjustable inflation air bags; and
control circuitry configured to control the airflow control systems to adjust inflation of the adjustable inflation air bags in response to a three-dimensional face scan of the user.

17. The head-mounted device defined in claim 16 further comprising a three-dimensional image sensor configured to capture the three-dimensional face scan of the user.

18. The head-mounted device defined in claim 16 wherein the ring-shaped electrically adjustable face cushion comprises a printed circuit containing a ring of strain gauges.

19. A head-mounted device configured to be worn on a face of a user, comprising:

left and right displays configured to operate in a first mode in which a first type of content is displayed and a second mode in which a second type of content is displayed;

a head-mounted support structure that supports the left and right displays; and an electrically adjustable face cushion that extends around a peripheral edge of the head-mounted support structure, wherein the electrically adjustable face cushion comprises air bags and adjustable airflow control systems configured to adjust inflation of the air bags in response to changes between the first mode and the second mode.

20. The head-mounted device defined in claim 19 wherein the first mode comprises a gaming mode, wherein the first type of content comprises gaming content, wherein the second mode comprises a movie mode, wherein the second type of content comprises movie content, the electrically adjustable face cushion further comprising a ring of force sensors overlapped by the air bags, wherein the adjustable airflow control systems comprise airflow valves and piezoelectric pumps configured to adjust inflation of the air bags in response to force measurements from the force sensors.

\* \* \* \* \*